United States Patent
März et al.

(10) Patent No.: US 12,104,414 B2
(45) Date of Patent: Oct. 1, 2024

(54) UNLOCKING DEVICE FOR UNLOCKING A LOCK OF A MOVABLE VEHICLE ELEMENT AND VEHICLE

(71) Applicant: WITTE AUTOMOTIVE GMBH, Velbert (DE)

(72) Inventors: Tomas März, Nejdek (CZ); Radek Ducka, Jirkov (CZ)

(73) Assignee: Witte Automotive GmbH, Velbert (DE)

( * ) Notice: Subject to any disclaimer, the term of this patent is extended or adjusted under 35 U.S.C. 154(b) by 509 days.

(21) Appl. No.: 17/253,177

(22) PCT Filed: Jun. 18, 2019

(86) PCT No.: PCT/EP2019/066011
§ 371 (c)(1),
(2) Date: Dec. 17, 2020

(87) PCT Pub. No.: WO2019/243330
PCT Pub. Date: Dec. 26, 2019

(65) Prior Publication Data
US 2021/0270064 A1    Sep. 2, 2021

(30) Foreign Application Priority Data
Jun. 19, 2018 (DE) ............... 10 2018 209 867.0

(51) Int. Cl.
*E05B 81/76* (2014.01)
*B60Q 1/26* (2006.01)
(Continued)

(52) U.S. Cl.
CPC ............ *E05B 79/20* (2013.01); *B60Q 1/2661* (2013.01); *E05B 17/10* (2013.01); *E05B 81/77* (2013.01); *E05B 83/24* (2013.01)

(58) Field of Classification Search
CPC ........ E05B 83/16; E05B 83/24; E05B 83/247; E05B 17/10; E05B 41/00; E05B 79/20; E05B 81/25
See application file for complete search history.

(56) References Cited

U.S. PATENT DOCUMENTS

| | | | |
|---|---|---|---|
| 5,329,206 A | 7/1994 | Slotkowski et al. | |
| 6,209,933 B1 * | 4/2001 | Ang ................. | E05B 17/10 |
| | | | 292/DIG. 43 |

(Continued)

FOREIGN PATENT DOCUMENTS

| | | |
|---|---|---|
| CN | 1253606 A | 5/2000 |
| CN | 106476902 A | 3/2017 |

(Continued)

OTHER PUBLICATIONS

The China National Intellectual Property Administration, Office Action in Application No. CN 201980039599.0, dated Jun. 24, 2021, 14 pages.

(Continued)

*Primary Examiner* — Alyson M Merlino
(74) *Attorney, Agent, or Firm* — Marshall & Melhorn, LLC

(57) ABSTRACT

An unlocking device for unlocking a lock of a movable vehicle element, in particular a vehicle door, a vehicle front hood and/or a vehicle tailgate is described. The device may have at least a detection unit for detecting at least one approaching object, and a lighting unit that may have an illumination region for illuminating a detection region of the detection unit. The lighting unit and/or the detection unit becoming or being activated at least when the locking mechanism is or has been brought into the pre-latching position.

16 Claims, 4 Drawing Sheets

(51) Int. Cl.
*E05B 17/10* (2006.01)
*E05B 79/20* (2014.01)
*E05B 83/24* (2014.01)

(56) References Cited

U.S. PATENT DOCUMENTS

| | | | | |
|---|---|---|---|---|
| 6,349,984 | B1 * | 2/2002 | Marrazzo | E05B 83/26 |
| | | | | 292/DIG. 43 |
| 6,390,529 | B1 * | 5/2002 | Bingle | E05B 79/20 |
| | | | | 292/DIG. 43 |
| 6,648,493 | B2 * | 11/2003 | Klein | E05B 17/10 |
| | | | | 362/802 |
| 6,761,384 | B1 * | 7/2004 | Haaf | E05B 83/26 |
| | | | | 340/426.36 |
| 7,751,664 | B2 | 7/2010 | Ieda et al. | |
| 9,499,127 | B2 | 11/2016 | Pribisic et al. | |
| 9,777,516 | B2 * | 10/2017 | Farooq | E05B 79/20 |
| 9,925,953 | B2 | 3/2018 | Pribisic et al. | |
| 10,099,656 | B2 | 10/2018 | Pribisic et al. | |
| 10,113,340 | B2 * | 10/2018 | Gawade | E05B 17/10 |
| 11,377,881 | B2 * | 7/2022 | Bartola | E05B 83/24 |
| 11,414,900 | B2 * | 8/2022 | Sturm | E05B 79/20 |
| 2017/0138098 | A1 * | 5/2017 | Covarrubias Pazaran | |
| | | | | E05B 83/24 |
| 2018/0029528 | A1 | 2/2018 | Gawade et al. | |

FOREIGN PATENT DOCUMENTS

| | | | |
|---|---|---|---|
| CN | 107663972 A | | 2/2018 |
| DE | 102007050094 A1 | | 4/2009 |
| DE | 102015101164 A1 | | 7/2015 |
| DE | 102015109006 A1 | | 12/2015 |
| DE | 102016103425 A1 | | 8/2017 |
| DE | 102016011749 A1 | | 3/2018 |
| KR | 20070059597 A | * | 6/2007 |
| KR | 20100025114 A | * | 3/2010 |
| KR | 20160029322 A | * | 3/2016 |

OTHER PUBLICATIONS

European Patent Office, International Search Report with Written Opinion, issued in PCT/EP2019/066011, Sep. 10, 2019, 14 pages, European Patent Office, Rijswijk, Netherlands.

German Patent Office, cover page of the earliest claimed German priority document DE102018209867A1 with German Search Report citations, Dec. 19, 2019, 1 page, German Patent Office, Germany.

European Patent Office, Office Action in Application No. EP 19 732 586.3, dated Mar. 20, 2023, 4 pages.

* cited by examiner

UNLOCKING DEVICE FOR UNLOCKING A LOCK OF A MOVABLE VEHICLE ELEMENT AND VEHICLE

BACKGROUND OF THE INVENTION

The invention relates to an unlocking device for unlocking a lock of a movable vehicle element, in particular a vehicle door, a vehicle front hood and/or a vehicle tailgate. The invention further relates to a vehicle comprising an unlocking device of this kind.

A lock of the kind mentioned at the outset is used in motor vehicles, for example, for locking backrests, doors, tailgates, trunk lids or similar. To unlock the lock, for example, a ratchet mechanism formed by a pawl, a catch and a closure element is manually set in motion in order to move the pawl from a locking position into an unlocking position.

The problem addressed by the invention is that of providing an unlocking device which is improved over the prior art for unlocking a lock of a movable vehicle element, in particular a vehicle door, a vehicle front hood and/or a vehicle tailgate, in particular to assist a user in finding an actuation region for opening the movable vehicle element. A further problem addressed by the invention is that of providing an improved vehicle.

The problem is solved according to the invention by a locking device having the features in the claims. In respect of the vehicle, the problem is solved according to the invention by the features of the claims.

The dependent claims relate to advantageous embodiments of the invention.

An unlocking device for unlocking and/or opening a lock of a movable vehicle element, in particular a vehicle door, a vehicle front hood and/or a vehicle tailgate, comprises at least one locking mechanism for locking the lock, the locking mechanism holding the lock in at least a primary locking position or a pre-latching position, a detection unit which has a detection region in order to detect at least one object approaching the detection region or located or moving in the detection region, and a lighting unit comprising an illumination region for illuminating the detection region of the detection unit, the lighting unit becoming or being activated at least when the locking mechanism is or has been brought into the pre-latching position.

A further unlocking device for unlocking a lock of a movable vehicle element, in particular a vehicle door, a vehicle front hood and/or a vehicle tailgate, comprises at least one actuator which is coupled to a locking mechanism of the lock. The unlocking device further comprises at least one detection unit for detecting at least one approaching object, the detection unit being coupled to the actuator. Furthermore, the unlocking device comprises at least one lighting unit comprising an illumination region for illuminating a detection region of the detection unit. In particular, the illumination region corresponds to the detection region. The detection region is formed between the stationary or fixed vehicle element and the movable vehicle element. When an object located in the illuminated detection region is detected, the actuator automatically unlocks the locking mechanism. In particular, the actuator brings the locking mechanism into an unlocking position. When the locking mechanism is unlocked, the movable vehicle element is released for opening. This means that a user can move the movable vehicle element when unlocking occurs. In a locking position of the locking mechanism, the movable vehicle element is locked to a fixed vehicle element, such as a lower part of the vehicle body.

The advantages achieved with the invention lie in particular in the fact that automatic unlocking of the locking mechanism is possible for the user. For example, the object is a hand of the user or the user himself. In particular, keyless actuation of the unlocking device and opening of the movable vehicle element is possible. The detection unit detects, for example, an approach of the user's hand to the illuminated detection region or a movement of the hand into the illuminated detection region and controls the actuator when the hand is detected, the actuator automatically unlocking the locking mechanism completely so that the user can then fully open the movable vehicle element, for example lift or swivel it. This can be done manually by the user. Alternatively, the detection unit can be coupled to an adjusting actuator, in particular a servomotor or a spring unit, the detection unit first actuating the actuator so that it completely unlocks the locking mechanism and then actuating the actuator so that the movable vehicle element automatically opens completely. This reduces time and effort, for example, if searching for a key to unlock the lock is avoided. In particular, intuitive opening of the movable vehicle element is possible. Furthermore, the installation space for the unlocking device is substantially reduced, for example by omitting an unlocking lock, comprising a catch and pawl, in the handle region of the movable vehicle element.

According to a further aspect, when an object approaching the detection region or located or moving in the detection region, such as a user's hand, is detected, the locking mechanism is automatically unlocked completely. This opens the lock. In other words, by illuminating the detection region between the movable vehicle element, which is partially open due to the pre-latching position of the locking mechanism, and the stationary vehicle element, the user can easily identify the region in which he can insert his hand in order to automatically and completely unlock the locking mechanism on account of his hand which has been inserted into this detection region and detected. The user can then manually open the movable vehicle element, in particular lift or swivel it, after the automatic and complete unlocking of the movable vehicle element.

In addition, the lighting unit can be activated when an object, in particular a person with access authorization, approaching the movable vehicle element is detected. For example, the user carries a transponder for transmitting an access authorization to the vehicle. When the access authorization is detected, the lighting unit illuminates a specific path toward the movable vehicle element. For this purpose, the detection unit and/or a further detection unit can comprise a detection region directed into an environment of the movable or stationary vehicle element. If the object is then detected within the illuminated detection region of the detection unit, the locking mechanism is actuated.

In particular, the lighting unit is provided for illuminating a position of the detection unit. This indicates where the object has to be positioned, for example inserted or moved, in particular for complete unlocking of the lock.

According to another embodiment, the locking mechanism, in particular the lock, can be brought into at least three positions. For example, the locking mechanism can be brought into at least a primary locking position, a pre-latching position and an unlocking position. In the primary locking position, a locking element, for example in the form of a latch and/or hook element, in particular a pawl and/or a safety hook, of the locking mechanism is located in a primary latching position in which at least one striker element is fixed rigidly, i.e. substantially immovably, by means of the locking element. For example, the striker element is arranged in the region of the movable vehicle element and the locking mechanism with the locking element is arranged on the fixed vehicle element or vice versa. In this primary locking position, the movable vehicle element is fastened to the stationary or fixed vehicle element and is held in a closed position, for example.

The locking element can be transferred or switched from the primary locking position into the pre-latching position, in particular the secondary locking position. In this pre-latching position, the locking element and the striker element are in an unlocked and partially released, in particular still secured position. For example, in the pre-latching position of the locking mechanism, the movable vehicle element is partially lifted relative to the stationary or fixed vehicle element and is thus placed into an intermediate position, in particular an illumination, release or access position. For this purpose, the locking mechanism comprises, for example, a resilient spring element for mechanically lifting the movable vehicle element relative to the stationary vehicle element. The resilient element slightly lifts the movable vehicle element when the locking element is partially released.

In order to transfer the locking element from the primary locking position into the secondary locking position, the locking mechanism is coupled to an actuation element arranged in the vehicle and/or on the movable vehicle element, for example.

According to a development, the actuation element is coupled by means of signals and/or coupled in motion to the locking mechanism in order to bring the locking mechanism, and thus the lock, into the pre-latching position and thus to partially unlock same. For this purpose, the actuation element is coupled to a Bowden cable, for example, which in turn is coupled to the locking mechanism, in particular to the locking element.

When the actuation element, for example in the form of a lever and/or a button in the vehicle interior and/or on the movable vehicle element, is actuated, the locking mechanism, in particular its locking element, is released from the primary locking position and unlocked. This causes the movable vehicle element, in particular the engine hood, to be transferred into a slightly open position, in particular lifted in a spring-assisted manner, in particular by means of the spring element. When the locking element is transferred from the primary locking position into the pre-latching position, the lighting unit is or becomes activatable or activated. The lighting unit is provided for illuminating a hand engagement or hand insertion position for complete unlocking of the locking mechanism. Due to the slightly lifted movable vehicle element, targeted hand insertion is made easier.

In other words, when the locking mechanism is actuated to transfer the locking element from the primary locking position into the pre-latching position, the lighting unit is or becomes activatable or activated in order to illuminate the detection region of the detection unit. Complete unlocking of the locking mechanism is then possible by inserting a hand beneath the slightly open movable vehicle element, in particular the engine hood, and within the detection region. If the hand is detected within the illuminated detection region of the detection unit, the locking mechanism is automatically unlocked. In the unlocking position of the locking mechanism, the movable vehicle element, in particular the engine hood, can then be lifted completely, in particular manually or automatically.

In a development, the detection unit comprises at least one electronic sensor and/or actuator, in particular a capacitive sensor. For example, contactless detection of the object approaching and/or located or moving in the detection region is possible by means of the capacitive sensor. If a user's hand is located in the detection region, the actuator is or becomes activated and unlocks the locking mechanism. Alternatively or in addition, the detection unit comprises an electronic actuator, for example a touch sensor, contact sensor and/or touch switch.

For example, the actuator is coupled by means of signals and/or coupled in motion to the locking mechanism of the lock for completely unlocking the lock. If the lock is designed as an electronic lock, for example, the actuator transmits a control signal for automatically unlocking the lock. If the lock is designed as a mechanical lock, for example, the actuator, for example a servomotor, is coupled to a Bowden cable which actuates the lock, in particular the locking element, accordingly, and unlocks and thus opens same in particular by means of tensile force.

Furthermore, the detection unit can be coupled to the actuator by means of signals, with the actuator automatically unlocking the locking mechanism completely and opening same when an object, such as a hand, is detected in the detection region. In particular, when an object is identified in the detection region, the detection unit automatically sends a control signal to the actuator, which then mechanically actuates the locking element by means of a Bowden cable.

According to a further aspect, the detection unit and the lighting unit are coupled to the actuator by means of signals in such a way that, when the actuator brings or has brought the locking mechanism into the unlocking position, at least the lighting unit is deactivated.

According to a further embodiment, the detection unit is arranged in an insertion, gripping or handle region of the movable vehicle element. The user is intuitively guided to the insertion, gripping or handle region by means of the illumination of the detection region. In particular, the movable vehicle element can be opened, for example lifted or pivoted, directly by the user at the gripping region following contactless unlocking, for example.

In another possible embodiment, the detection unit is designed to detect touching of the gripping region by the object and/or touching of a contact surface of the detection unit by the object. For example, a contact element for detecting touching is arranged on a lower face of the movable vehicle element, i.e. on a side facing away from the user, for example. When there is touching, the actuator is activated and unlocks the locking mechanism. The user does not have to give up his hand, as is the case for example when opening using a conventional key, and can open the vehicle element directly after unlocking. A smooth movement for unlocking the lock and for opening, i.e. for example pushing up or pulling up the movable vehicle element, is possible. Alternatively, the detection unit is located in the region of a fixed vehicle element, for example on a lower part of the vehicle body. In this case, the detection region is directed upward. Furthermore, the user can touch the contact surface of the detection unit with his hand and/or fingers, which unlocks the locking mechanism. The detection unit is arranged, for example, on a beam element, in particular a crossbeam element. The beam element, for example, has a width that corresponds to a width of the fixed vehicle element. This allows the detection unit to be fixed in a simple and robust manner.

The detection region of the detection unit is directed upward in this case. For example, the detection unit comprises a contact surface for detecting touching by the object.

A shape and size of the detection region and/or of the contact surface is adapted to object shapes as far as possible. For example, the detection unit has a pad-like or approximately, at least hand-sized, rectangular or oval detection region and/or contact surface.

According to one possible embodiment, the lighting unit comprises at least one LED. The lighting unit thus requires a small installation space. In particular, a use duration of the lighting unit is increased by using an LED. Furthermore, overheating of the illumination region is avoided.

According to a further embodiment, the actuator is coupled to the locking mechanism via least one Bowden cable. In particular, this coupling can be adjusted to various installation spaces. The installation of the Bowden cable is as simple as possible. In addition, rapid mechanical actuation of the locking mechanism is possible when the actuator is activated. For example, the actuator comprises an actuating unit which actuates the Bowden cable. For example, the Bowden cable is coupled to a safety hook and/or a pawl of the locking mechanism and releases same from a locking position when the Bowden cable is actuated.

In a possible development, the actuator and the detection unit are coupled to one another at least by means of signals. For example, the unlocking device comprises wireless and/or wired communication between the individual components. For example, the actuator is coupled to the detection unit by means of signals using a cable. Alternatively, the actuator is coupled to the detection unit by means of a radio link. When an object is detected by the detection unit, a signal, in particular a control signal, is transmitted to the actuator. The actuator is then activated and the Bowden cable is actuated.

Furthermore, the invention describes a movable vehicle element, in particular a vehicle door, a vehicle front hood and/or a vehicle tailgate, comprising at least one lock with an unlocking device for unlocking the lock.

The invention also describes a vehicle comprising at least one movable vehicle element which is arranged or mounted on a stationary or fixed vehicle element so as to be movable between a closed position, an intermediate position and an open position, and comprising an unlocking device for the movable vehicle element. In the closed position of the movable vehicle element, the locking mechanism is in the primary locking position. In the intermediate position (also referred to as the illumination, release, unlocking or gripping position) of the movable vehicle element, the locking mechanism is in the pre-latching position. In the open position (also referred to as the opened position) of the movable vehicle element, the locking mechanism is in the unlocking position.

A further vehicle comprising a movable vehicle element which is mounted on a stationary or fixed vehicle element so as to be movable between a closed position, an intermediate position and an open position comprises at least one detection unit that has a detection region in order to detect at least one object approaching the detection region or located or moving in the detection region, and a lighting unit comprising an illumination region which illuminates the detection region of the detection unit, the lighting unit and/or the detection unit becoming or being activated at least when the movable vehicle element is or has been brought into the intermediate position.

In addition, the vehicle can have at least one actuation unit which is coupled to a locking mechanism for partially unlocking the lock, and an actuator which is coupled to the locking mechanism for completely unlocking and opening the lock, the detection unit and/or the lighting unit being coupled to the actuator at least by means of signals in such a way that, when the actuator brings or has brought the locking mechanism into a pre-latching position, the detection unit and/or the lighting unit becomes/become or is/are activated.

Furthermore, the lighting unit can be designed to illuminate the detection region when the locking mechanism has been brought into its pre-latching position and the movable vehicle element has been brought into the intermediate position, in particular into the illumination or release or gripping position. The detection region is formed between the stationary or fixed vehicle element and the movable and partially open vehicle element. The detection region and the illumination region overlap in this case. The detection region and the illumination region are substantially the same in terms of shape, size and dimensions.

When the detection region is illuminated and an object located or moving in the illuminated detection region is detected, the actuator then automatically unlocks the locking mechanism completely so that the locking mechanism and thus the lock is opened.

BRIEF DESCRIPTION OF THE DRAWINGS

Embodiments of the invention will be described in more detail in the following with reference to the drawings, in which.

Parts that correspond to one another are provided with the same reference signs in all the figures.

DETAILED DESCRIPTION

Figure 1:
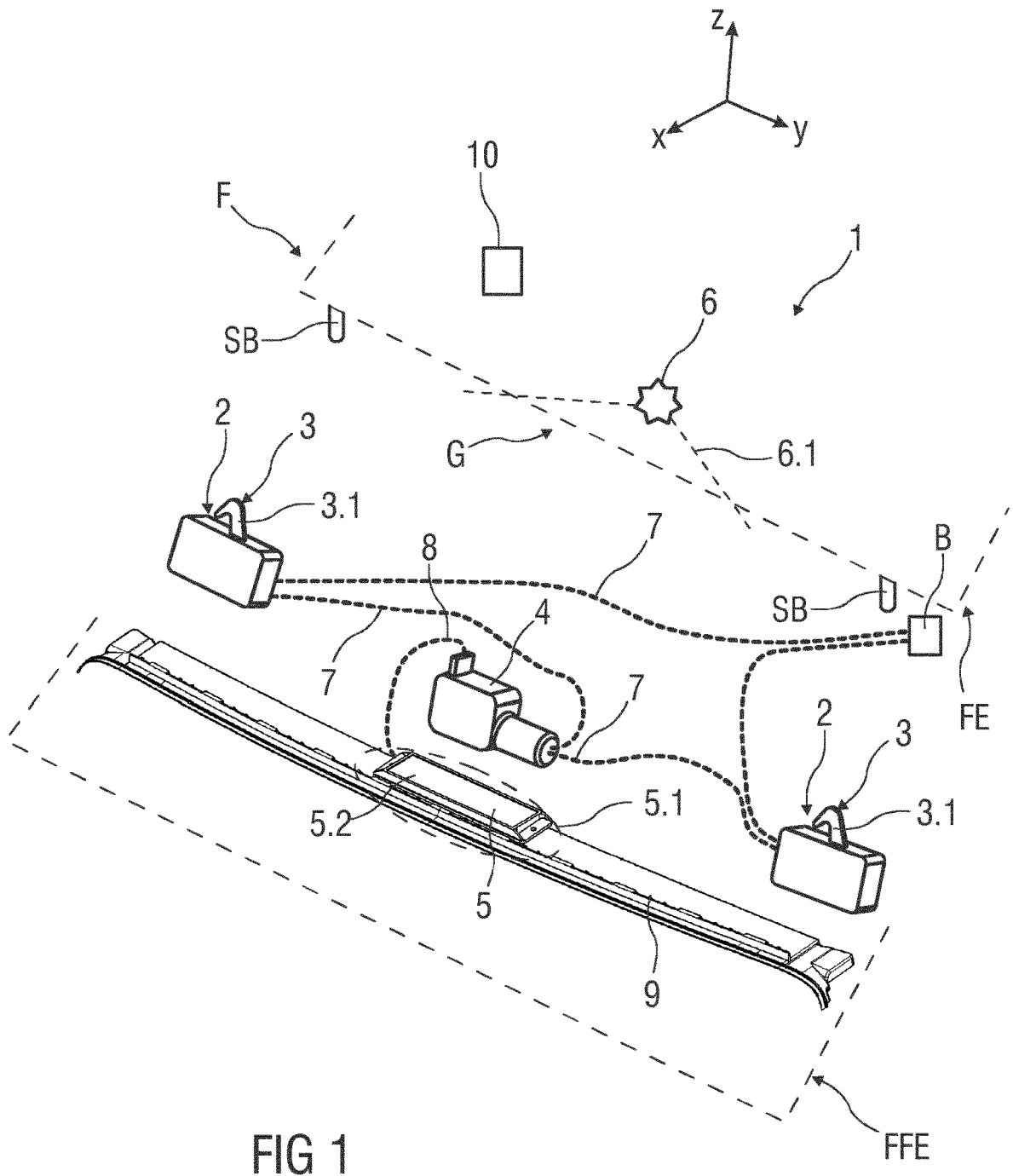
FIG. 1 is a schematic perspective view of one embodiment of an unlocking device for unlocking a lock of a movable vehicle element, in particular a vehicle front hood, FIG. 2 schematically shows an actuation of the unlocking device carried out by an object, FIG. 3A to 3C schematically show an opening sequence of the movable vehicle element, and FIG. 4A to 4C schematically show embodiments of a locking mechanism of the lock in different positions during the opening sequence of the movable vehicle element.

FIG. 1 schematically shows a movable vehicle element FE of a vehicle F. In the embodiment shown, the movable vehicle element FE is in particular a vehicle front hood.

The vehicle element FE comprises an unlocking device 1 for unlocking at least one lock 2. The lock 2 is for example a conventional ratchet mechanism comprising at least one locking mechanism 3 having for example a locking element 3.1, for example a latch and/or hook element, in particular a pawl and/or a safety hook. The locking mechanism 3 can be brought for example into three positions, a primary locking position PV shown in FIG. 4A, a pre-latching position V shown in FIG. 4B, an unlocking position E shown in FIG. 4C. In the primary locking position PV and the pre-latching position V, for example a striker element SB arranged on the movable vehicle element FE is or can be locked in a relative manner in or to the lock 2 by means of the locking element 3.1 and the lock 2 is thus locked.

In the embodiment, the unlocking device 1 comprises two identical locks 2. The number of locks 2 depends in particular on the size of the movable vehicle element FE to be locked. In the case of a small movable vehicle element FE, it may also be the case that only one lock 2 is provided. In the case of a larger movable vehicle element FE, a plurality of locks 2 may be provided.

The unlocking device 1 further comprises a detection unit 5 which has a detection region 5.1 in order to detect at least one object O approaching the detection region 5.1 or located or moving in the detection region 5.1, and a lighting unit 6 comprising an illumination region 6.1 for illuminating the detection region 5.1 of the detection unit 5, the lighting unit 6 and/or the detection unit 5 becoming or being activated at least when the locking mechanism 3 is or has been brought into the pre-latching position V.

The unlocking device 1 further comprises an actuator 4 which is coupled to the locking mechanism 3 of the lock 2. The actuator 4 is a conventional actuator 4, for example, which is used in unlocking and locking systems of vehicle doors, gas caps, tailgates or vehicle front hoods. The actuator 4 is arranged in the region of the movable vehicle element FE or in another region of the vehicle F, for example. The actuator 4 comprises, for example, an actuating unit (not shown in more detail), such as a servomotor or adjusting function, by means of which the actuator 4 can actuate, in particular unlock, the locking mechanism 3. When the locking mechanism 3 is unlocked, the striker element SB is released, as a result of which the movable vehicle element FE is released for opening.

The detection unit 5 is coupled to the actuator 4. In particular, the detection unit 5 is coupled to the actuator 4 by means of signals, for example by means of a signal-transmission line, in particular a data bus connection such as a CAN bus or another suitable signal-transmission cable 5.

The lighting unit 6 comprises a number of LEDs, for example.

When an object O located or moving in the illuminated detection region 5.1 is detected, the actuator 4 automatically unlocks the locking mechanism 3. In particular, the actuator 4 is coupled to the locking mechanism 3 in such a way that the locking mechanism 3 can be brought into an unlocking position E, shown in FIG. 4C, when the actuator 4 is activated.

For example, the detection unit 5 comprises a number of capacitive sensors. Alternatively or in addition, the detection unit 5 comprises a number of electronic actuators. In particular, the detection unit 5 comprises proximity and/or touch sensors for identifying touching in order to identify, for example, an approaching or moving object O at a handle G, such as a front hood handle or engine hood handle and to release or lock a function such as a locking or unlocking function. For example, the object O is an approaching hand and/or fingers of a user or a user of the vehicle F himself.

For example, the lighting unit 6 can be actuated in such a way that the lighting unit 6 can be activated, in particular automatically activated, when a user access authorization is determined by the vehicle F. For this purpose, the lighting unit 6 is coupled to a control unit 10 arranged in the vehicle F. By means of the illumination region 6.1, a position of the detection unit 5 is visible to the user. The user or the object O can thus intuitively reach into or toward the detection region 5.1. In particular, the illumination region 6.1 corresponds to the detection region 5.1.

According to a further embodiment, the lighting unit 6 can be actuated in such a way that the lighting unit 6 can be activated, in particular switched on and providing illumination, when the locking element 3.1 is transferred from the primary locking position PV into the pre-latching position V. The lighting unit 6 is provided for illuminating a hand engagement or hand insertion position for completely unlocking the locking mechanism 3, i.e. for transferring the locking mechanism 3 from the pre-latching position V into the unlocking position E.

In other words, when the locking mechanism 3 is actuated for transferring the locking element 3.1 from the primary locking position PV into the pre-latching position V, the lighting unit 6 can be activated in order to illuminate the detection region 5.1 of the detection unit 5. For example, the locking mechanism 3 is brought from the primary locking position PV, in which the movable vehicle element FE is locked in a closed position P1 (FIG. 3A, 4A) and is thus held securely, into the pre-latching position V (FIG. 3B, 4B) when an actuation element B, in particular a lever in the vehicle interior, is manually actuated by a user by means of a Bowden cable 7 pulled as a result, for example.

In a development, the unlocking device 1 and the lock 2 or locks 2 are arranged in the region of a fixed vehicle element FFE. A fixed vehicle element FFE is understood to mean, for example, a vehicle body and/or a storage and/or installation space located beneath the movable vehicle element FE. The at least one lock 2 locks the movable vehicle element FE to the fixed vehicle element FFE.

The detection unit 5 is arranged such that the detection region 5.1 is directed upward. For example, the object O is identified when the object O is located above the detection unit 5.

For better understanding of the description, a coordinate system comprising a longitudinal axis x, a transverse axis y and a vertical axis z is shown with respect to the vehicle F.

In particular, the detection unit 5 is arranged in a front region of the fixed vehicle element FFE so that the detection unit 5 is easily accessible to the object O.

The lighting unit 6 is arranged in the front region of the movable vehicle element FE, for example. The lighting unit 6.1 is directed upward for illuminating the detection region 5.1. This means that the position of the detection unit 5 is visible to the user from above while standing. If the object O is located in the detection region 5.1, the object O is further illuminated from above by the lighting unit 6.

Alternatively or in addition, the lighting unit 6 is arranged in the lower, fixed vehicle element FFE. For example, the lighting unit 6 is arranged in the vicinity of the detection unit 5. The illumination region 6.1 is directed upward for illuminating the detection region 5.1.

For example, the movable vehicle element FE can be locked to the fixed vehicle element FFE by means of two locks 2. The locks 2 are arranged in edge regions of the fixed vehicle element FFE.

In the embodiment shown, the locks 2 are conventional ratchet mechanisms. The locks 2 each comprise a locking mechanism 3. For example, the ratchet mechanisms comprise a catch, which has a closure element, and a pawl.

The locks 2 are coupled to one another for synchronous triggering of the unlocking. For example, the locks 2 are coupled to one another by means of the Bowden cable 7 or by means of another force—and/or signal-transmission element. A plurality of individual Bowden cables 7 may also be provided.

One or both locks 2 is/are coupled to the actuator 4, in particular coupled in motion. In particular, the lock 2 is coupled to the actuator 4 by means of a Bowden cable 7 or by means of another force—and/or signal transmission element. Alternatively, the actuator 4 can actuate an associated Bowden cable 7 for each lock 2. By actuation of the actuator 4, and a resulting actuation of the Bowden cable(s) 7, the locks 2 can be triggered in particular for complete unlocking. In particular, the locks 2 are brought from the pre-latching position V into the unlocking position E by means of actuation of the Bowden cable 7 or Bowden cables 7 by the actuator 4, and said locks are completely unlocked (FIG. 3C, FIG. 4C). The locks 2 are thus open.

The actuator 4 is coupled to the detection unit 5 by means of signals. For example, the actuator 4 is coupled to the detection unit 5 by means of a signal-transmission cable 8. A detection signal from the detection unit 5 actuates the actuator 4 when an object O, such as a hand, is detected in the detection region 5.1.

The detection unit 5 is arranged, for example, on a beam element 9, in particular a crossbeam. The beam element 9 has a width which corresponds to a width of the fixed vehicle element FFE, in particular a lower part of the movable vehicle element FE, for example. The detection unit 5 can thus be fixed in a simple and robust manner.

The detection region 5.1 of the detection unit 5 is directed upward. For example, the detection unit 5 comprises a contact surface 5.2 for detecting touching by the object O. A shape and size of the detection region 5.1 and/or the contact surface 5.1 is adapted as far as possible to object shapes. For example, the detection unit 5 has a pad-like or approximately, at least hand-sized, rectangular or oval detection region 5.1 and/or contact surface 5.2.

For example, the lighting unit 6 is arranged on a lower surface side of the movable vehicle element FE. This means that the lighting unit 6 is arranged such that the illumination region 6.1 is directed toward the fixed vehicle element FFE. For example, the lighting unit 6 is oriented centrally with respect to the detection unit 5 in order to illuminate the detection region 5.1 effectively. In a development, the lighting unit 6 comprises a plurality of LEDs in order to correspond to a shape of the detection unit 5.

Figure 2:
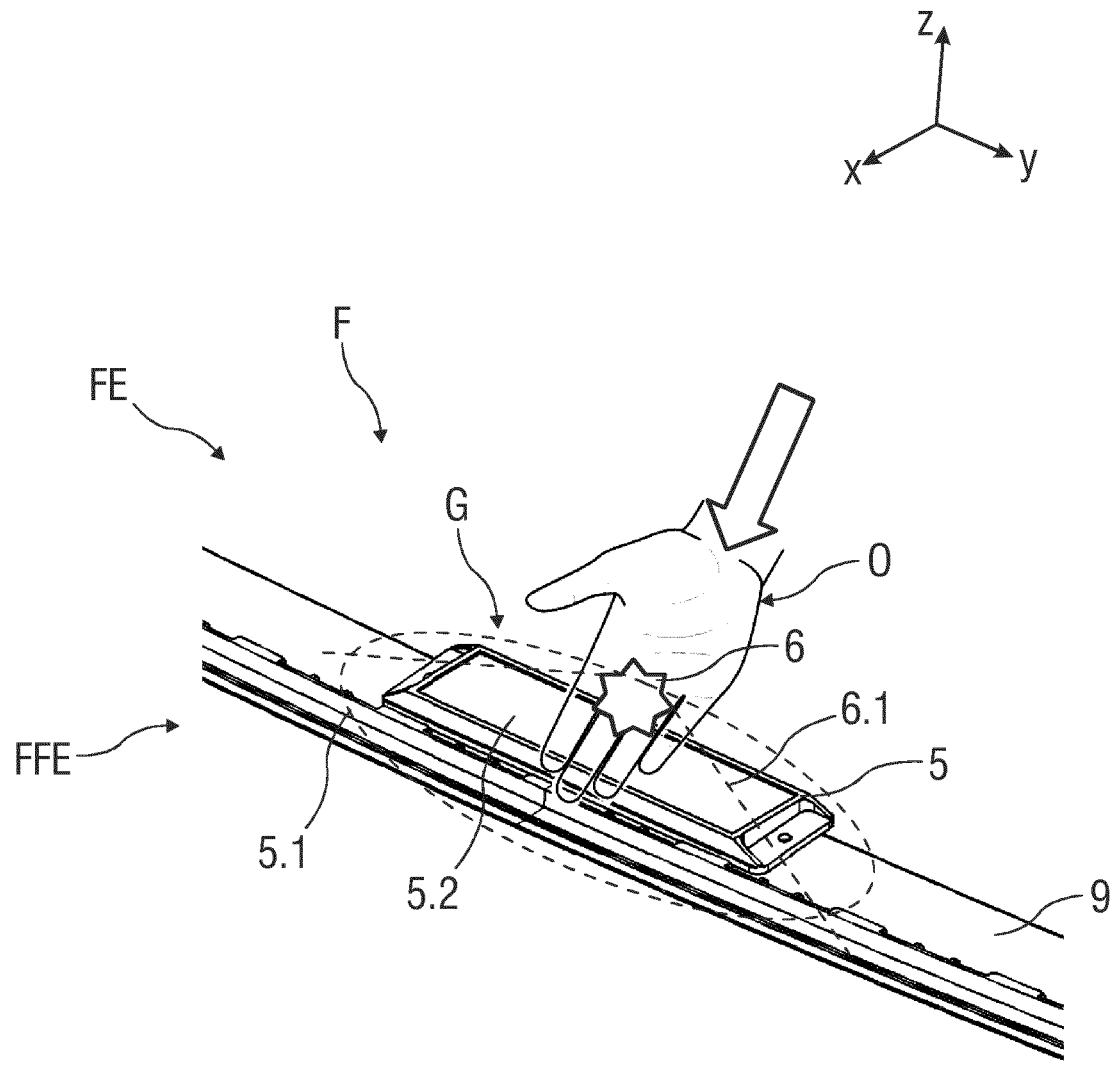

FIG. 2 schematically shows an actuation of the unlocking device 1 carried out by an object O. The object O is a user's hand in the embodiment shown. The hand is located between the fixed vehicle element FFE and the movable vehicle element FE. Using the illumination region 6.1, when the lighting unit 6 is activated the user knows where the detection region 5.1 and/or the contact surface 5.2 is/are arranged.

Figure 3A:
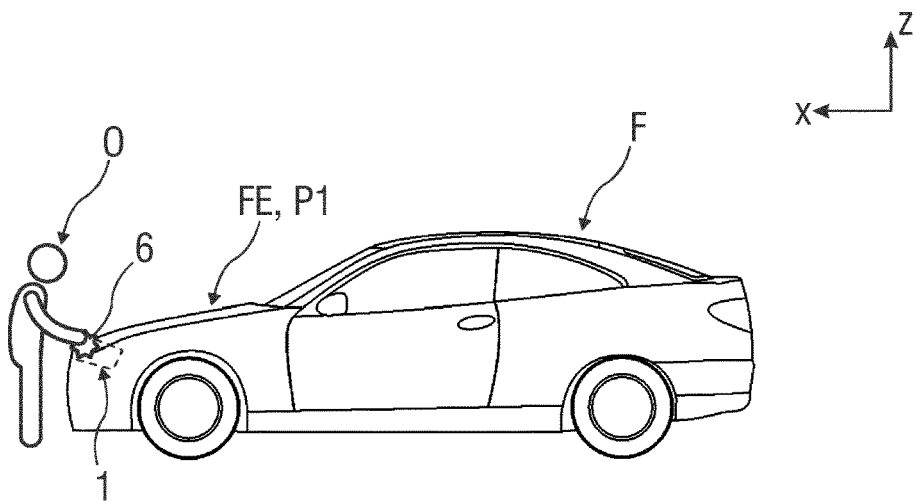
Figure 3B:
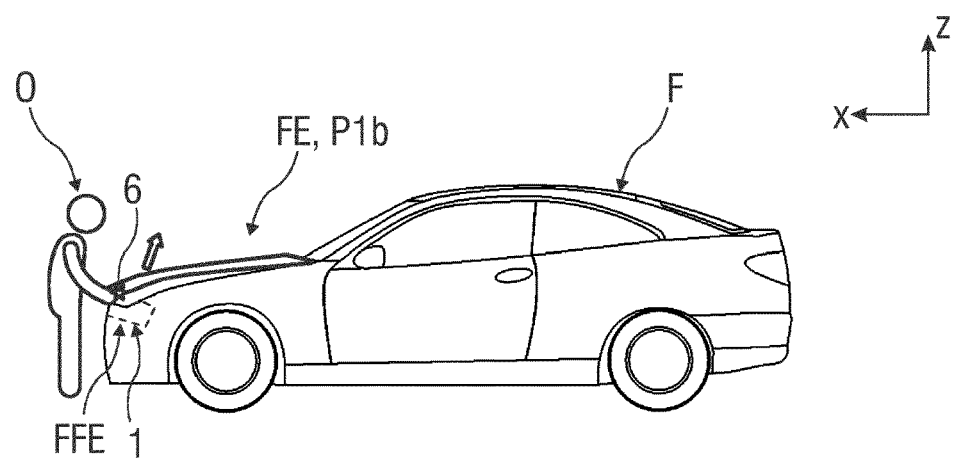
Figure 3C:
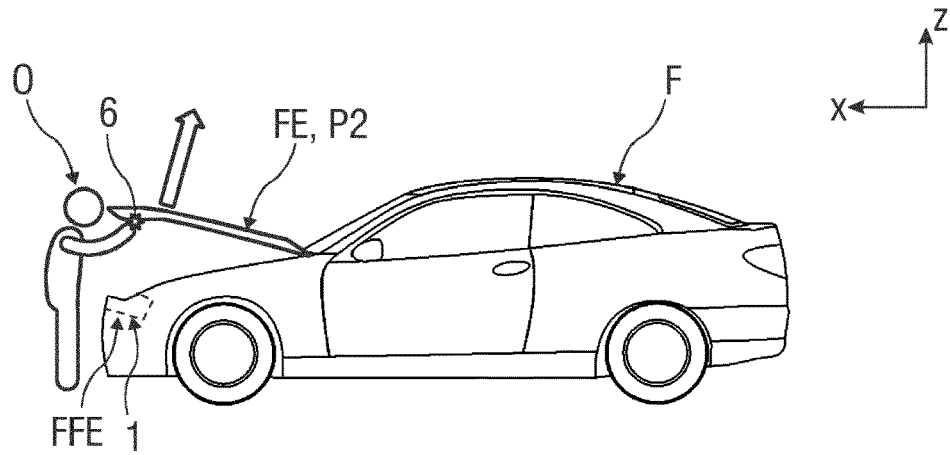

FIGS. 3A and 3B schematically show an opening sequence of the movable vehicle element FE.

In particular, FIG. 3A shows the movable vehicle element FE in a locked and closed position P1. FIG. 3B shows the movable vehicle element FE in an intermediate position P1b, in particular a partially unlocked and, in some regions, opened but still secured position. The movable vehicle element FE in this intermediate position P1b is set at a distance from the fixed vehicle element FFE, for example in a spring-assisted manner, and is thus partially open, but is still securely held by the locking mechanism 3 and cannot be opened. FIG. 3C shows the movable vehicle element FE in a completely unlocked and open position P2.

The vehicle F comprises, in a first embodiment, at least the at least one detection unit which has a detection region 5.1 in order to detect at least one object O approaching the detection region 5.1 or located or moving in the detection region 5.1, and the at least one lighting unit 6 comprising an illumination region 6.1 which illuminates the detection region 5.1 of the detection unit 5, the lighting unit 6 and/or the detection unit becoming or being activated at least when the movable vehicle element FE is or has been brought into the intermediate position P1b.

By at least activating the lighting unit 6 when the movable vehicle element FE has been brought into the intermediate position P1b according to FIG. 3A, the detection region 6.1 can be illuminated by means of the activated and illuminating lighting unit 6. Due to the slightly open position of the movable vehicle element FE, it is thus possible to see into the detection region 5.1 and said region is more easily identifiable than in the prior art on account of the illumination.

Figure 4A:
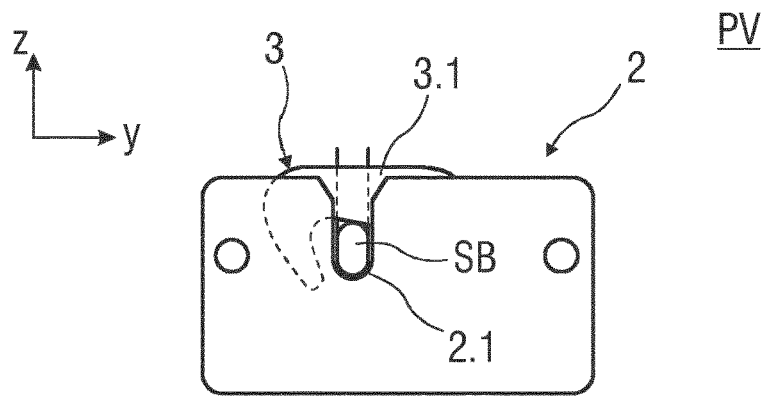
Figure 4B:
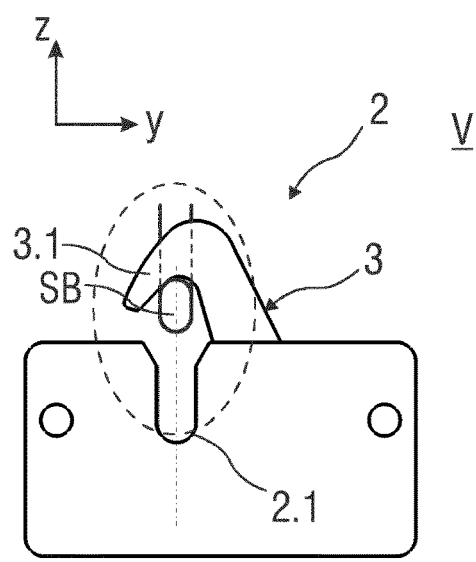
Figure 4C:
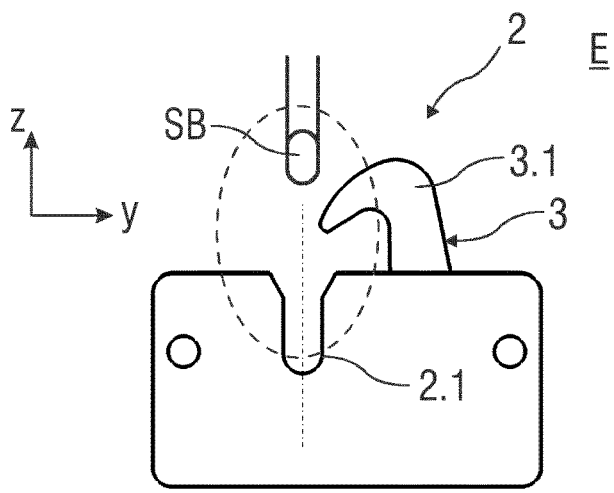

FIG. 4A to 4C each schematically show a simplified embodiment of a lock 2 comprising a locking mechanism 3. In particular, FIG. 4A shows the lock 2 with the locking mechanism 3 in a primary locking position PV, FIG. 4B shows the lock 2 with the locking mechanism 3 in a pre-latching position V and FIG. 4C shows the lock 2 with the locking mechanism 3 in an unlocking position E.

In the primary locking position PV shown in FIG. A4, the locking element 3.1, for example in the form of a latch and/or hook element, in particular a pawl and/or a safety hook, of the locking mechanism 3 is in a primary latching position in which the striker element SB is rigidly, i.e. substantially immovably, fixed to the lock 2 by means of the locking element 3.1. For example, the lock 2 comprises a receiving portion 2.1 which is designed to receive and fix the striker element SB relative to the lock 2. For example, the receiving portion 2.1 is in the form of a slot and/or a recess.

The locking element 3.1 can be transferred or switched from the primary locking position into the pre-latching position V, in particular the secondary locking position. In the pre-latching position V shown in FIG. 4B, the locking element 3.1 and the striker element SB are in a partially released, unlocked and secured position. For example, the movable vehicle element FE is partially lifted in the pre-latching position V.

For this purpose, the locking mechanism 3 comprises a resilient spring element (not shown in more detail) for mechanically lifting the movable vehicle element FE depending on the position of the locking element 3.1. The resilient element lifts the movable vehicle element FE slightly when the locking element 3.1 is partially unlocked. In order to transfer the locking element 3.1 from the primary locking position PV into the pre-latching position V, the locking mechanism 3 is coupled for example to an actuation element arranged in the vehicle F and/or on the movable vehicle element FE.

When the actuation element B, for example in the form of a lever and/or a button in the vehicle interior and/or on the movable vehicle element FE, is actuated, the locking element 3.1 is released from the primary locking position PV. The movable vehicle element FE, in particular the engine hood, is transferred into a slightly open position, the intermediate position P1b, in particular is lifted in a spring-assisted manner.

When the locking element 3.1 is transferred from the primary locking position PV into the pre-latching position V, the lighting unit 6 is activatable or becomes activated. The lighting unit 6 is provided for illuminating a hand engagement or hand insertion position for further, complete unlocking of the locking mechanism 3, i.e. for transferring the locking mechanism 3 from the pre-latching position V into the unlocking position E. Due to the slightly lifted movable vehicle element FE and the illuminated detection region 5.1, targeted hand insertion is made easier.

LIST OF REFERENCE SIGNS

1 Unlocking device
2 Lock
2.1 Receiving portion
3 Locking mechanism
3.1 Locking element
4 Actuator
5 Detection unit 5.1 Detection region
5.2 Contact surface
6 Lighting unit
6.1 Illumination region
7 Bowden cable
8 Signal-transmission cable
9 Beam element
10 Control unit
B Actuation element
E Unlocking position
F Vehicle
FE Movable vehicle element
FFE Fixed vehicle element
G Handle
O Object
P1, P2 Position
P1b Intermediate position
PV Primary locking position
SB Striker element
V Pre-latching position
x Longitudinal axis
y Transverse axis
Z Vertical axis

The invention claimed is:

1. An unlocking device for unlocking and opening a lock of a movable vehicle element of a vehicle, wherein the unlocking device comprises:
the lock comprising a locking mechanism having a primary locking position and a partially unlocked and partially opened pre-latching position,
a detection unit having a detection region, the detection unit detecting at least one object approaching the detection region or located or moving in the detection region, and
a lighting unit comprising an illumination region for illuminating the detection region of the detection unit, the lighting unit and/or the detection unit becoming or being activated at least when the locking mechanism is or has been brought into the partially unlocked and partially opened pre-latching position,
wherein when the locking mechanism is in the partially unlocked and partially opened pre-latching position, the detection region is adapted to be accessible from outside the vehicle, in which the detection unit is located, and wherein an actuator is provided for placing the locking mechanism in a completely unlocked position when activated by the detection unit upon access to the detection region, from outside the vehicle, by the at least one object approaching the detection region or located or moving in the detection region.

2. The unlocking device according to claim 1, wherein the detection unit comprises at least one electronic sensor and a capacitive sensor.

3. The unlocking device according to claim 1, wherein an actuation element is provided which is coupled to the locking mechanism for partially unlocking the locking mechanism in order to bring the locking mechanism into the partially unlocked and partially opened pre-latching position.

4. The unlocking device according to claim 1, wherein the actuator is coupled to the locking mechanism of the lock for phrase-placing the locking mechanism in the completely unlocked position.

5. The unlocking device according to claim 4, wherein the detection unit is coupled to the actuator, wherein, when the at least one object is detected to be approaching the detection region or is located or is moved in the detection region, the actuator automatically places the locking mechanism in the completely unlocked position, thereby opening the lock.

6. The unlocking device according to claim 4, wherein the detection unit and the lighting unit are coupled to the actuator in such a way that, when the actuator brings or has brought the locking mechanism into the completely unlocked position least the lighting unit is deactivated.

7. The unlocking device according to claim 1, wherein the actuator automatically places the locking mechanism in the completely unlocked position when activated by the detection unit.

8. The unlocking device according to claim 1, wherein the detection region is touchless such that the detection unit activates actuator without contact from the at least object.

9. A vehicle comprising a movable vehicle element which is arranged on a stationary or fixed vehicle element so as to be movable between a closed position, an intermediate position, and an open position, wherein the vehicle comprises:
a lock comprising a locking mechanism having a primary locking position and a partially unlocked and partially opened pre-latching position,
a detection unit having a detection region, the detection unit detecting at least one object approaching the detection region or is located or is moving in the detection region, and
a lighting unit comprising an illumination region which illuminates the detection region of the detection unit, the lighting unit and/or the detection unit becoming or being activated at least when the movable vehicle element is or has been brought into the intermediate position,
wherein when the locking mechanism is in the partially unlocked and partially opened pre-latching position and the movable vehicle element is in the intermediate position, the detection region is adapted to be accessible from outside the vehicle, in which the detection unit is located, and wherein an actuator is provided for placing the locking mechanism in a completely unlocked position when activated by the detection unit upon access to the detection region, from outside the vehicle, by the at least one object approaching the detection region or located or moving in the detection region.

10. The vehicle according to claim 9, wherein the vehicle further comprises:
an actuation element which is coupled to the locking mechanism, wherein the actuator is coupled to the locking mechanism for placing the locking mechanism in the completely unlocked position, thereby opening the lock, and wherein the detection unit and the lighting unit are coupled to the actuator in such a way that, when the actuator brings or has brought the locking mechanism into the partially unlocked and partially opened pre-latching position, the detection union and/or lighting unit become or are activated.

11. The vehicle according to claim 10, wherein the lighting unit is designed to illuminate the detection region when the locking mechanism has been brought into the partially unlocked and partially opened pre-latching position and the movable vehicle element has been brought into the intermediate position.

12. The vehicle according to claim 9, wherein the detection region is formed between the stationary or fixed vehicle element and the movable vehicle element,
wherein, when the detection region is illuminated by the lighting unit and the at least one object is approaching the detection region or is located or is moving in the detection region so as to be detected, the actuator places the locking mechanism in the completely unlocked position, thereby opening the lock.

13. The vehicle according to claim 9, wherein the detection unit comprises at least one electronic sensor and a capacitive sensor.

14. The vehicle according to claim 9, wherein the detection unit is arranged in the movable vehicle element and/or on the stationary or fixed vehicle element.

15. The vehicle according to claim 9, wherein the detection unit is designed to detect touching of a handle region and/or a contact surface of the detection unit by the at least one object.

16. The vehicle according to claim 9, wherein the actuator is coupled to the locking mechanism via a Bowden cable.

* * * * *

UNITED STATES PATENT AND TRADEMARK OFFICE
CERTIFICATE OF CORRECTION

| | | |
|---|---|---|
| PATENT NO. | : 12,104,414 B2 | Page 1 of 1 |
| APPLICATION NO. | : 17/253177 | |
| DATED | : October 1, 2024 | |
| INVENTOR(S) | : Tomas März and Radek Ducka | |

It is certified that error appears in the above-identified patent and that said Letters Patent is hereby corrected as shown below:

In the Claims

Claim 4, Line 3 should read as follows:
placing the locking mechanism in the completely Signed and Sealed this
Eleventh Day of February, 2025

Coke Morgan Stewart
*Acting Director of the United States Patent and Trademark Office*